United States Patent [19]

Luebke et al.

[11] Patent Number: 4,951,645

[45] Date of Patent: Aug. 28, 1990

[54] STACKED DUEL MODULE COMMERCIAL HOT AIR IMPINGEMENT COOKING OVEN

[75] Inventors: Clement J. Luebke, Burlington, Vt.; Gerald W. Sank, Pasadena, Md.; Frank A. Slade, Montain Top, Pa.

[73] Assignee: Welbilt Corporation, New Hyde Park, N.Y.

[21] Appl. No.: 283,783

[22] Filed: Dec. 13, 1988

Related U.S. Application Data

[63] Continuation-in-part of Ser. No. 279,094, Dec. 2, 1988.

[51] Int. Cl.⁵ .............................................. A21B 1/08
[52] U.S. Cl. .................................. 126/20.1; 126/17 R; 126/21 A; 99/414
[58] Field of Search ................ 126/19 R, 21 R, 21 A, 126/20.1, 337 R; 99/443, 467, 474, 447

[56] References Cited

U.S. PATENT DOCUMENTS

| | | | |
|---|---|---|---|
| 2,098,295 | 11/1937 | Kettering | 128/473 |
| 2,940,381 | 6/1960 | Cottongin | 99/445 |
| 3,304,406 | 2/1969 | King . | |
| 3,324,844 | 6/1967 | Huffman | 126/21 A |
| 3,326,201 | 6/1967 | Murray . | |
| 3,538,904 | 11/1970 | Baker | 126/21 |
| 3,568,590 | 3/1971 | Grice | 99/446 |
| 3,908,533 | 9/1975 | Fagerstrom et al. | 99/386 |
| 3,935,809 | 2/1976 | Bauer | 99/447 |
| 3,946,651 | 3/1976 | Garcia | 99/444 |
| 4,008,996 | 2/1977 | Wells | 126/21 R X |
| 4,154,861 | 5/1979 | Smith | 426/466 |
| 4,189,995 | 2/1980 | Zohr et al. | 99/447 |
| 4,354,549 | 10/1982 | Smith | 165/62 |
| 4,377,109 | 3/1983 | Brown et al. | 99/401 |
| 4,455,478 | 6/1984 | Guibert | 219/400 |
| 4,471,750 | 9/1984 | Burtea | 126/19 R X |
| 4,492,839 | 1/1985 | Smith | 219/10.55 |
| 4,796,600 | 1/1989 | Hurley et al. | 126/21 R X |

FOREIGN PATENT DOCUMENTS

| | | | |
|---|---|---|---|
| 0099551 | 2/1984 | European Pat. Off. | 99/551 |
| 8700261 | 1/1987 | PCT Int'l Appl. | 426/523 |
| 865937 | 8/1953 | Fed. Rep. of Germany . | |
| 969018 | 4/1958 | Fed. Rep. of Germany . | |
| 1128601 | 4/1962 | Fed. Rep. of Germany . | |

Primary Examiner—Larry Jones
Attorney, Agent, or Firm—Hubbard, Thurman, Turner, Tucker & Harris

[57] ABSTRACT

A commerical, dual tier pizza cooking over is formed from substantially similar but relatively inverted lower and upper modules. The lower module has a housing, with a cooking chamber therein, which is floor supported in an elevated position by suitable depending support legs and has a downwardly projecting fan and heating section used to create a recirculating flow of air, heated to a suitable food cooking temperature, through the housing. The upper module housing is stacked on top of the lower module housing, and its fan and heating section projects upwardly therefrom and also operates to create a recirculating flow of heated air through its cooking chamber. Perforated metal food support plates are horizontally disposed in each of the two cooking chambers for support the pizzas to be cooked. Plenum structures on opposite sides of the support plates in each of the two cooking chambers operate to receive portions of the heated air recirculated therethrough and convert them to series of heated air cooking jets which evenly blanket the opposite sides of the support plates in a manner transferring heat thereto at an accelerated rate to thereby rapidly and evenly cook the pizzas or other food items supported on the plates.

14 Claims, 3 Drawing Sheets

STACKED DUEL MODULE COMMERCIAL HOT AIR IMPINGEMENT COOKING OVEN

CROSS-REFERENCE TO RELATED APPLICATION

This application is a continuation-in-part of U.S. application No. 279,094 pending, entitled "IMPROVED COMMERCIAL HOT AIR IMPINGEMENT COOKING APPARATUS", which was filed on Dec. 2, 1988 and is hereby incorporated herein by reference.

BACKGROUND OF THE INVENTION

The present invention relates generally to cooking apparatus and, in a preferred embodiment thereof, more particularly provides a commercial hot air impingement cooking oven which may be utilized to very rapidly and evenly cook pizzas and provides a variety of advantages over conventional commercial pizza cooking devices such as the familiar "stone hearth" oven.

Conventional commercial cooking devices, such as stone hearth ovens, used to cook pizzas, bread, pastries and the like are subject to a variety of well known disadvantages and limitations including relatively high fabrication and operating costs, lengthy pre-cooking warmup time, undesirable variation in batch-to-batch cooking times, and/or uneven heat transfer to the food items being cooked.

The stone hearth used in these conventional pizza ovens to support and cook the pizzas is typically approximately 1½" thick and takes approximately two hours to be preheated from room temperature to its approximately 500° F. operating temperature. Because of this elongated warmup time, it is conventional practice, while the pizza establishment is closed during the night, to very uneconomically maintain the oven at a holding temperature of approximately 300° F. so that the warmup time at the beginning of the next business day is reduced to an acceptably short time.

Because of the very substantial thermal lag unavoidably associated with these thick stone hearths, there is a substantial variation in batch cooking times. For example, the first batch of pizzas cooked in a given business day, after the stone hearth has been preheated to its 500° F. operating temperature, takes approximately 10 minutes. However, the next batch typically takes approximately 12 minutes, and the succeeding batches take approximately 15 minutes each.

It is accordingly an object of the present invention to provide improved commercial cooking apparatus for pizzas, bread, pastries and the like which eliminates or minimizes abovementioned and other disadvantages and limitations typically associated with commercial cooking devices such as stone hearth pizza ovens.

SUMMARY OF THE INVENTION

In carrying out principles of the present invention, in accordance with a preferred embodiment thereof, a stacked, dual module commercial hot air impingement pizza cooking oven is provided in which a recirculated flow of air, heated to an appropriate food cooking temperature, is utilized to very rapidly and evenly cook the top and bottom sides of pizzas operatively supported within the oven.

The lower oven module comprises a housing having a cooking chamber therein which is accessible through a swing-down door mounted on the front side of the housing. Suitable support legs secured to the housing support it in an elevated position relative to the floor. Depending from the lower side of the housing, generally between the support legs, is a fan and heating section utilized to create a recirculating flow of air, heated to an appropriate food cooking temperature, through the housing.

Horizontally supported within the cooking chamber is a large area, relatively thin food support plate which is uniformly perforated to provide the plate with a relatively large "open" area. Plenum means are vertically spaced apart from the upper and lower side surfaces of the perforated food support plate and function to convert portions of the heated recirculating air into spaced series of relatively high velocity, vertically directed heated air jets which impinge upon the opposite upper and lower side surfaces of the perforated food support plate.

The jets are caused to laterally diffuse and at least slightly overlap prior to striking their associated food support plate side surface, thereby evenly blanketing such side surface with heated impingement air. In this manner, heat from the recirculating air is very evenly transferred to the food support plate, and to the pizzas or other food items (such as bread, pastries or the like) supported thereby, at an accelerated rate to very uniformly and rapidly cook the pizzas regardless of their positions on the food support plate, and without the necessity of moving the pizzas during the cooking process. In the preferred embodiment of the present invention, the cooking air beneath the food support plate flows upwardly through its perforations and, with the cooking air from above the plate, is drawn outwardly from the cooking chamber and returned to the depending fan and heating section through a suitable return flow passage within the housing.

The upper oven module is substantially identical in construction (as to the components used) and operation to the first oven module except that it is inverted (so that its fan and heating section projects upwardly from its housing), is not provided with floor support legs, and has a front cooking chamber access door which pivots in an opening direction toward what would normally be the top side wall of its housing. To form the dual module pizza oven of thee present invention, all that is necessary is to place the second module housing atop the first module housing in a vertically "stacked" orientation so that the two fan and heating sections project vertically in opposite directions from their associated housings.

It can readily be seen that in addition to the cooking advantages provided by the oven of the present invention, the stackable modular construction thereof also provides for simplified manufacturing and enhanced design flexibility. For example, if a single tier pizza oven is initially desired by a customer, a lower oven module is simply provided. If it is later desired to double the customer's pizza cooking capabilities, without requiring any additional floor space or replacing his first unit, all that is necessary is to provide an inverted second module and stack it atop the housing of the existing first module. The substantial commonality of parts between the "upper" and "lower" modules of the dual tier pizza oven also significantly simplifies the initial manufacturing process.

DETAILED DESCRIPTION

Figure 1:
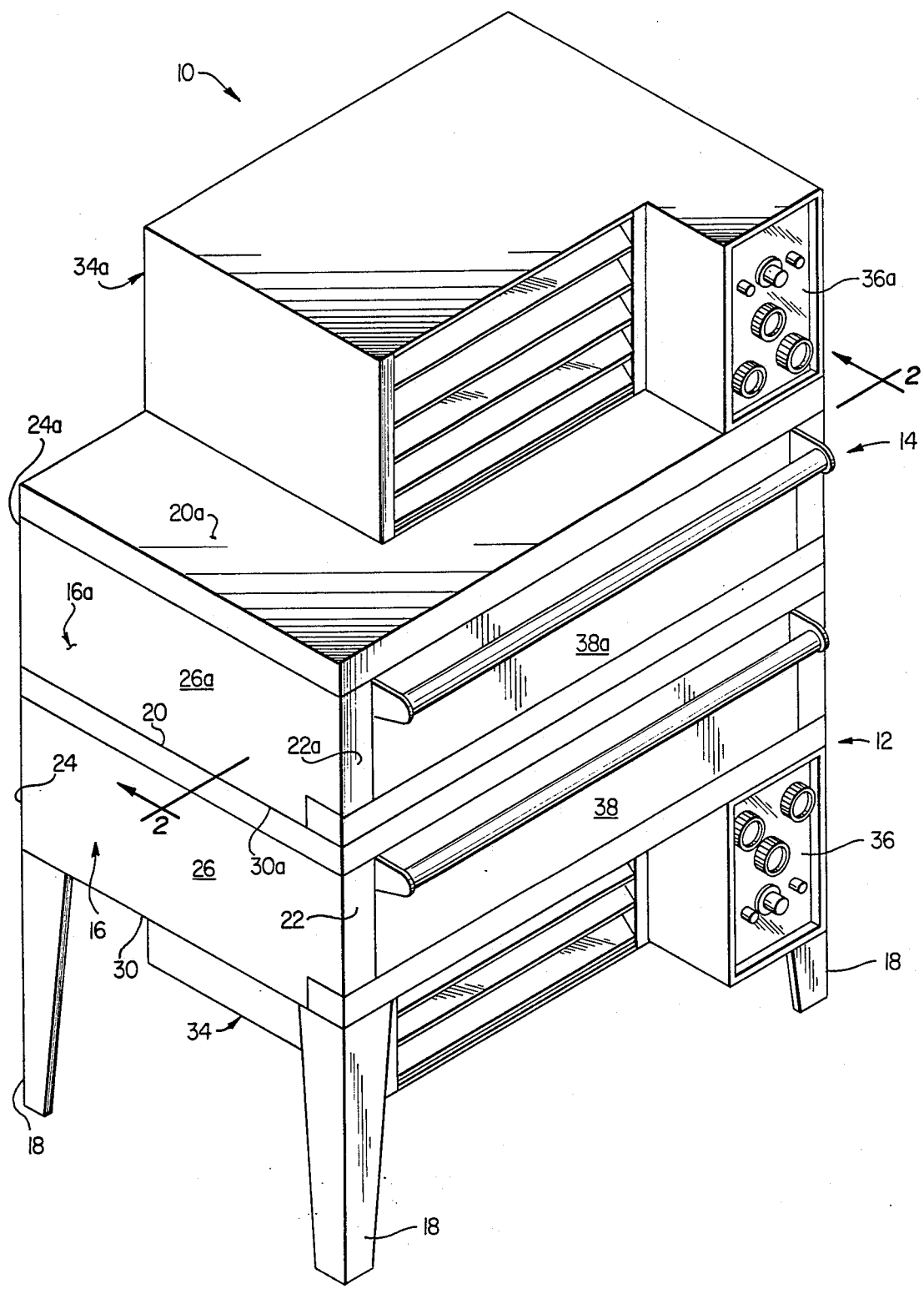
FIG. 1 is a perspective view of a stacked, dual module commercial hot air impingement pizza cooking oven embodying principles of the present invention.
Figure 2:
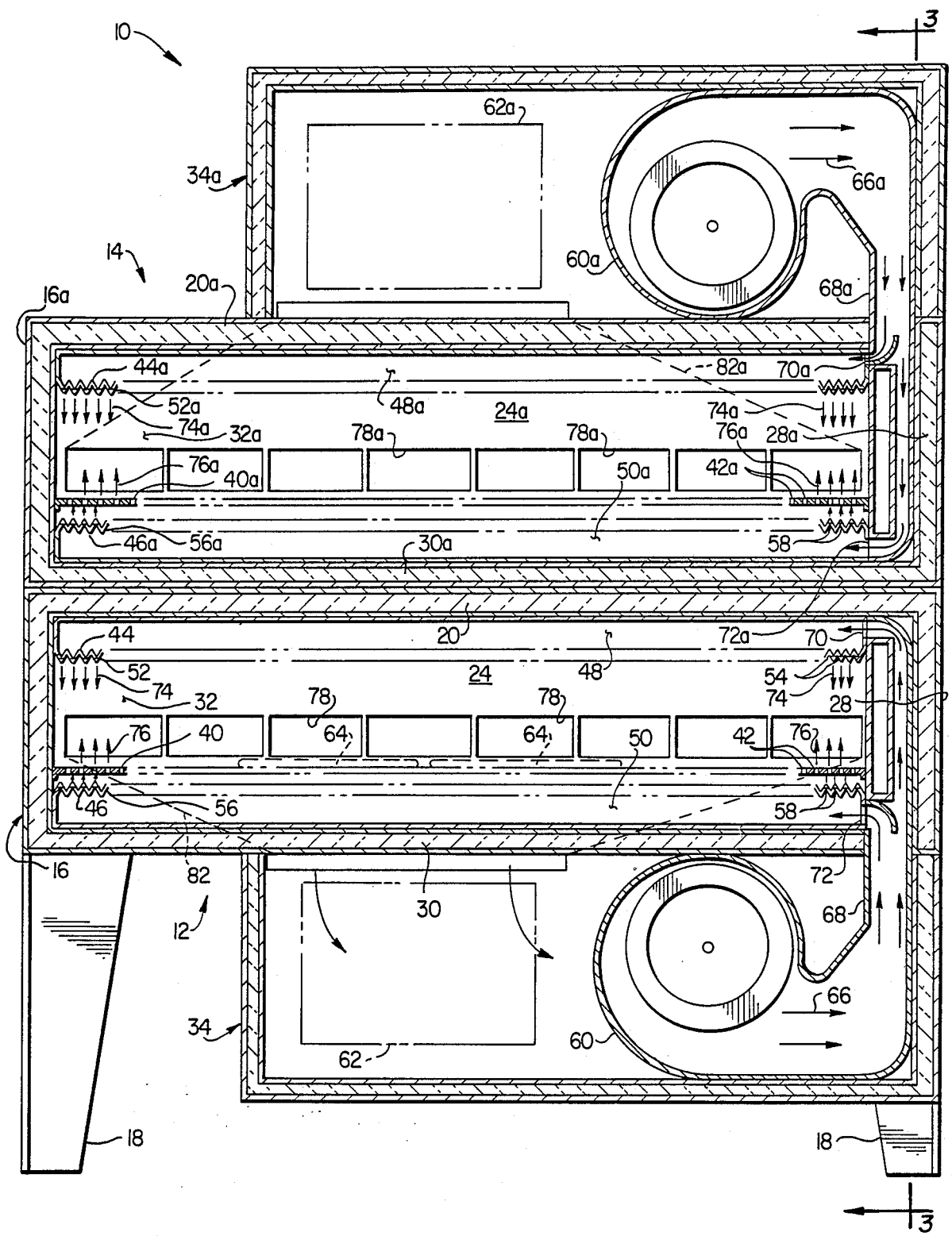
FIG. 2 is a partially schematic cross-sectional view through the oven taken along line 2—2 of FIG. 1.
Figure 3:
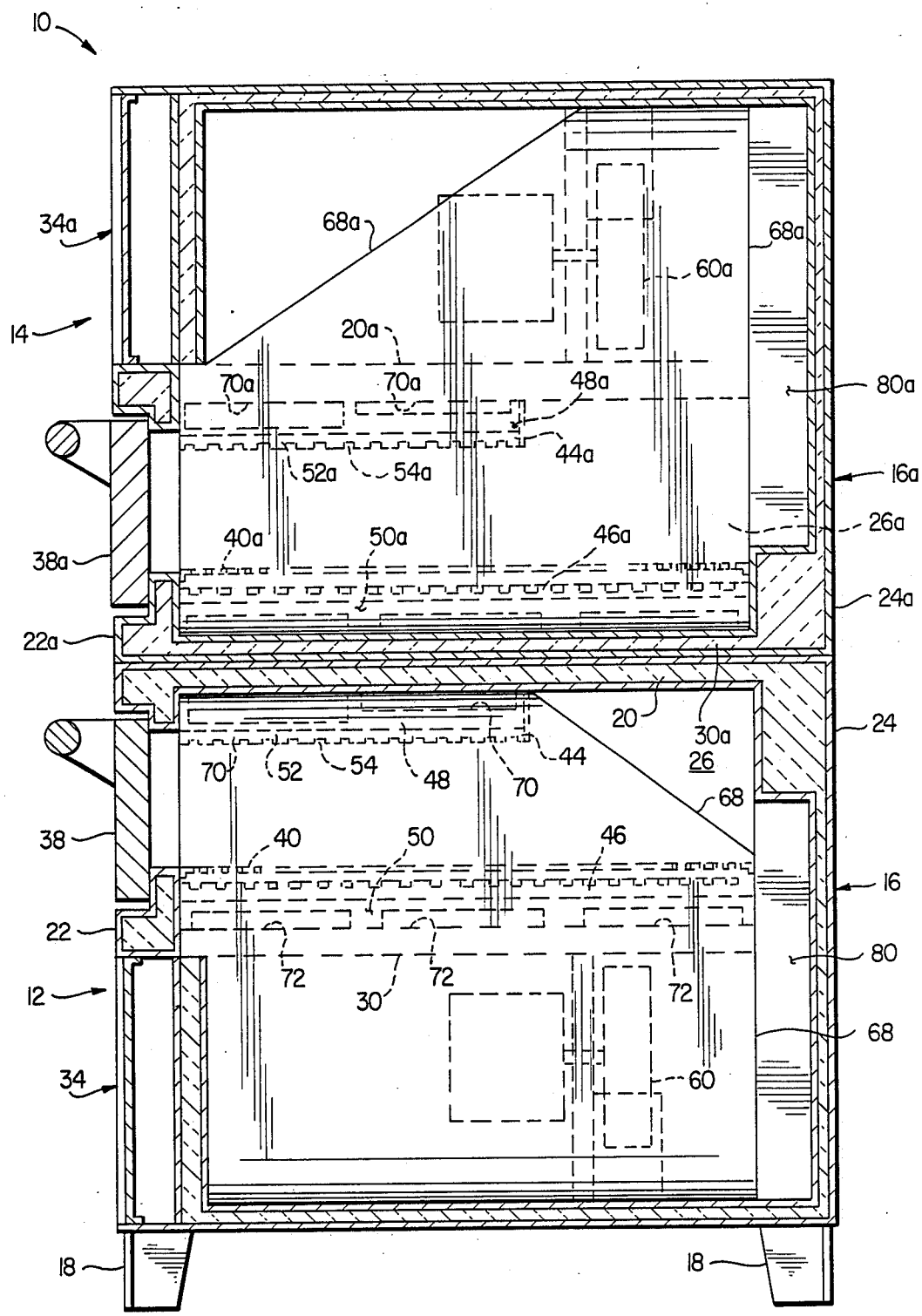
FIG. 3 is a cross-sectional view through the oven taken along line 3—3 of FIG. 2.

Illustrated in FIGS. 1-3 is a stacked, dual module commercial hot air impingement oven 10 which embodies principles of present invention and is used to very rapidly and evenly cook pizzas or other food items such as bread, pastries and the like. Oven 10 comprises a lower module 12 and a separate, upper module 14 which, in a manner subsequently described, is stacked atop the lower module. As will be seen, except for certain minor differences later described the two modules are substantially identical in construction and operation — the primary difference therebetween being that the upper module is, generally speaking, vertically inverted relative to lower module 12, as can best be seen in FIG. 1. For ease in comparison, parts in the upper module 14 corresponding to those in lower module 12 have been given identical reference numerals, but with the subscript "a".

The lower module 12 has an elongated rectangular housing 16 which is floor supportable by means of support legs 18 depending therefrom. Housing 16 is provided with internally insulated, double sided exterior walls including top wall 20, front wall 22, rear wall 24, left side wall 26, right side wall 28, and bottom wall 30. Disposed within the housing 16 is a cooking chamber 32, and a fan and heating section 34 depends from the bottom housing wall 30, generally between the support legs 18. A similar fan and heating section $34_a$ projects upwardly from the upper housing wall $20_a$ of the upper module $16_a$, the upper housing $16_a$ being stacked atop the lower module housing 16 as illustrated, the floor support legs being deleted from the upper module housing $16_a$. For controlling the cooking operation of the lower and upper modules 12 and 14, suitable control panels 36 and $36_a$ are mounted on the right front corners of the fan and heating sections 34 and $34_a$.

Access to the lower and upper cooking chambers 32, $32_a$ is provided by swing-down access doors 38, $38_a$ pivotally mounted on the front housing walls 22, $22_a$. The interior of the lower cooking chamber 32 is substantially identical to that of the upper cooking chamber $32_a$ and has a thin metal food support plate or deck 40 horizontally supported therein, the plate 40 having a series of circular holes 42 formed transversely therethrough. In the illustrated preferred embodiment of the perforated deck 40, its thickness is approximately 1/16", and the holes 42 have ¼" diameters and are spaced apart on staggered ½" centers. Respectively positioned above and below the deck 40 within the cooking chamber 32 are upper and lower corrugated walls 44 and 46 which define with the top and bottom walls 20 and 30 of the housing 16 upper and lower air supply plenums 48 and 50. The upper corrugated wall 44 has a series of downwardly projecting ridges 52 in which are formed a spaced series of rectangular air discharge slots 54. In a similar fashion, the lower corrugated plate 46 has a series of upwardly projecting ridges 56 in which a spaced series of elongated rectangular air discharge slots 58 are formed.

Disposed within the fan and heating section 34 is a supply fan 60 and a schematically depicted energy package 62 which, in a manner subsequently described, is used to heat air supplied by the fan 60 to the upper and lower supply plenums 48 and 50. The energy package 62, like the energy package $62_a$ in the upper fan and heating section $34_a$, may be a gas burner system or suitable electric heating elements.

The operation of the lower module 12 will now be described with reference to FIGS. 2 and 3. It will be appreciated that the operation of the upper module 14, which may be operated independently of the lower module, is identical in nature. With one or more pizzas 64 (or other food item such as bread, pastries or the like) supported on the perforated plate 40, the fan 60 delivers heated air 66 upwardly through a supply duct 68 into the upper and lower supply plenums 48, 50 via upper and lower discharge openings 70, 72 formed in the duct 68. Heated air entering the supply plenums 48, 50 is forced outwardly through the elongated air discharge slots 54 and 58 in the form of downwardly and upwardly directed, relatively high velocity heated air impingements jets 74 and 76. The jets 74, 76 laterally diffuse, and at least partially overlap with one another prior to striking the upper and lower side surfaces of the perforated deck 40, thereby evenly blanketing the opposite sides of the deck with impingement air, heated to a suitable food cooking temperature, to transfer cooking heat to the deck 40 at an accelerated rate. This accelerated, and quite even heat transfer to the plate 40 (and thus to the illustrated pizzas 64) causes the pizzas 64 to be cooked in a rapid and very even manner regardless of their positions within the cooking chamber 32, and without the necessity of moving the pizza during the cooking process.

The heated air in the upwardly directed impingement jets 76 is flowed upwardly through the plate perforations 42 and, together with the heated air in the downwardly directed jets 74 is flowed rearwardly out of the cooking chamber 32, through a horizontal series of return openings 78 formed through the inner surface of the rear wall 24, into a return plenum 80 which communicates, via a duct section 82 with the heating side of the fan and heating section 34. Air returned to the section 34 in this manner is drawn across the heating source in the energy package 62 and into the inlet 84 of the fan 60, thereby creating a recirculating flow of heated cooking air through the cooking chamber 32 of the housing 16. A similar air flow pattern is also established in the upper module 14.

For further structural details with regard to the corrugated plates, the perforated decks, and other components within the modules 12 and 14, the reader is referred to our copending U.S. patent application Ser. No. 279,094, filed on Dec. 2, 1988 and entitled "IMPROVED COMMERCIAL HOT AIR IMPINGEMENT COOKING APPARATUS", such application being incorporated herein by reference.

The diffused, evenly blanketed transverse impingement of the jets 74 and 76 on the opposite sides of the perforated deck 40 and the upper sides of the pizzas 64, and the horizontal return flow over the top of the pizzas, function to very uniformly cook the pizzas in a fraction of the time required by conventional stone hearth cooking ovens. The combination of this diffused, vertical impingement, which accelerates heat transfer to the pizzas 64, and the generally horizontal flow of return air across the top of the pizza, provides this significantly reduced cooking time, while at the same time maintaining a very high quality in the finally cooked pizzas.

The perforated deck 40 (like the upper perforated deck 40$_a$) is of a larger-than-standard commercial size (56" wide by 36" deep in the illustrated embodiment), and the floor "footprint" of the oven 10 is of a standard commercial size (approximately 63" wide by 45" deep) so that the oven 10 may be easily and quickly used to replace a standard stone hearth pizza oven.

The oven 10 provides a variety of advantages over conventional stone hearth pizza cooking ovens. The standard pizza oven now widely in use utilizes a 48" by 36" stone hearth cooking deck which typically has a 1½" thickness. Typically, no more than four 16" diameter standard pizzas can be efficiently cooked on the stone hearth. However, despite its standard sized floor "footprint", the lower module 12 of the oven 10 can simultaneously cook six standard 16" diameter pizzas on its enlarged 56" by 36" perforated deck. This enlarged cooking capacity of the lower module is, of course, doubled when the upper module is added by stacking it atop the lower module as illustrated in FIGS. 1-3.

In the standard pizza oven, its stone cooking hearth typically requires a warmup time of approximately two hours to be heated from room temperature to the typical operating temperature of approximately 500° F. As a practical matter, in most conventional pizza operations, the stone hearth oven is continuously operated at a reduced temperature (approximately 300° F.) when the establishment is closed to reduce this rather lengthy warmup time on the next business day. In sharp contrast, either module of the pizza cooking oven 10 of the present invention may be heated from room temperature to a similar 500° operating temperature in approximately 30 minutes. This very significantly reduces the total warmup and cooking time for the first batch of pizzas cooked in a given business day. It also eliminates the necessity of operating the oven at an intermediate holding temperature when the pizza establishment is closed. Either or both of the modules 12, 14 of the oven 10 can simply be turned on approximately ½ hour before the establishment opens, and will be brought from room temperature to the approximately 500° F. operating temperature when the business day starts.

In the conventional stone hearth oven, the very first batch of four pizzas is typically, cooked in approximately 10 minutes. However, the second batch of four pizzas typically takes approximately 12 minutes, due to the thermal lag inherent in the stone hearth, and subsequent four-pizza batches take approximately 15 minutes each. However, in the oven 10 of the present invention, due to the very rapid heat-up of the thin metal perforated decks 40 and 40$_a$, the first and each succeeding batch of six pizzas in each of the cooking chambers is cooked in approximately six minutes — there is no corresponding increase in the batch cooking time as in the case of the conventional stone hearth oven.

Importantly, due to the fact that each of the two modules 12, 14 in the oven 10 of the present invention is able to cook half again as many pizzas in a given batch as a conventional stone hearth oven, and, on the average, cooks the pizzas in somewhat less than half the time, the production capacity of each of the oven's modules is at least twice and potentially three times that of the conventional stone hearth oven. As previously mentioned, while particularly well suited to the cooking of pizzas, the oven 10 is also quite well suited to cooking a variety of other food products ranging from pastry items to a variety of meat products, if desired.

In addition to the cooking advantages provided by the oven 10 of the present invention, the stackable, modular construction thereof also provides for simplified manufacturing of the oven and enhanced design flexibility. For example, if a single tier pizza oven is initially desired by a customer, a lower oven module, such as the depicted lower module 12, is simply provided. If it is later desired to double the customer's pizza cooking capabilities, without requiring any additional floor space or replacing his first unit, all that is necessary is to provide an inverted second module (such as the illustrated upper module 14) and stack it atop the housing of the existing first module. The substantial commonality of parts between the upper and lower modules of the illustrated dual tier pizza oven also significantly simplifies the initial manufacturing process.

The foregoing detailed description is to be clearly understood as being given by way of illustration and example only, the spirit and scope of the present invention being limited solely by the appended claims.

What is claimed is:

1. A dual module, hot air impingement cooking oven comprising:

a lower module having a main housing supportable in an elevated position by floor support legs secured thereto and having an internal cooking chamber, a relatively large area heat conductive food support plate member horizontally supported in said cooking chamber, and a fan and heater housing depending from said main housing; and an upper module having a main housing substantially identical to said lower module main housing and removably stacked thereon, said upper module main housing having an internal cooking chamber in which a relatively large area heat conductive food support plate is horizontally supported, a top side wall, and a fan and heater housing secured to and projecting upwardly from said top side wall and being substantially identical to said lower module fan and heater housing, said lower and upper modules having substantially identical internal air handling and heating components which include:

means including fan and heater means disposed in said fan and heater housings, for creating in said lower and upper modules recirculating flows of heated air, at food cooking temperatures, which traverse said cooking chambers, and multiple jet forming means, disposed in said cooking chambers on opposite sides of said food support plate members, for converting portions of said recirculating flows of heated air into mutually spaced series of relatively high velocity heated air impingement jets which strike and evenly blanket major portions of the upper and lower side surfaces of said food support plate members in a manner transferring air heat to said food support plate members at an accelerated rate and evenly blanketing and cooking food items supported on said food support plate members without requiring movement of the supported food items within said cooking chambers and essentially regardless of the horizontal positioning of the food items on said support plate members.

2. The oven of claim 1 wherein:
said food support plate members are uniformly perforated.

3. The oven of claim 2 wherein:
the perforation area of each of said food support plate members is relatively large compared to its nonperforated area.

4. The oven of claim 1 wherein:
each of said food support plate members has a rectangular configuration with a width of approximately 56" and a depth of approximately 36" for accomodating multiple standard size food items to be cooked.

5. The oven of claim 1 wherein:
said oven is sized to fit within a rectangular floor footprint area approximately 63" wide by 45" deep.

6. A dual module, hot air impingement cooking oven comprising:
a lower module having a main housing supportable in an elevated position by floor support legs secured thereto and having an internal cooking chamber, a relatively large area heat conductive food support plate member horizontally supported in said cooking chamber, and a fan and heater housing depending from said main housing; and
an upper module having a main housing substantially identical to said lower module main housing and removably stacked thereon, said upper module main housing having an internal cooking chamber in which a relatively large area heat conductive food support plate is horizontally supported, a top side wall, and a fan and heater housing secured to and projecting upwardly from said top side wall and being substantially identical to said lower module fan and heater housing, said lower and upper modules having substantially identical internal air handling and heating components which include:
means, including fan and heater means disposed in said fan and heater housings, for creating in said lower and upper modules recirculating flows of heated air, at food cooking temperatures, which traverse said cooking chambers, and
multiple jet forming means, disposed in said cooking chambers on opposite sides of said food support plate members, for converting portions of said recirculating flows of heated air into mutually spaced series of relatively high velocity heated air impingement jets which strike and evenly blanket major portions of the upper and lower side surfaces of said food support plate members in a manner transferring air heat to said food support plate members at an accelerated rate,
said multiple jet forming means including, in each of said cooking chambers, upper and lower corrugated wall members positioned on opposite sides of the food support plate member and forming with interior surface portions of the associated main housing upper and lower supply plenums spaced vertically apart from the food support plate member and adapted to receive heated air from the associated fan means, each of said corrugated wall members having ridges therein in which spaced series of air discharge openings are formed.

7. The oven of claim 6 wherein:
said air discharge openings have generally rectangular configurations.

8. The oven of claim 6 wherein:
each of said ridges with discharge openings formed therein projects toward its associated food support plate member.

9. Commercial heated air impingement oven apparatus comprising:
a first module including:
a first housing having a first cooking chamber therein,
support leg means secured to said first housing for supporting it in an elevated position,
a relatively large area heat conductive first food support plate member horizontally supported within said first cooking chamber,
first heated air recirculating means, depending from said first housing, for creating and maintaining a first recirculating flow of heated air, at a food cooking temperature, within said first housing,
first multiple jet forming means, spaced downwardly apart from said first food support plate member, for converting a first portion of said first recirculating flow of heated air into a mutually spaced series of upwardly directed, relatively high velocity heated air impingement jets which laterally diffuse and at least partially overlap prior to striking the lower side surface of said first food support plate member to thereby evenly blanket it with heated air in a manner uniformly transferring heat from said first air portion to said first food support plate member at an accelerated rate,
second multiple jet forming means, spaced upwardly apart from said first food support plate member, for converting a second portion of said first recirculating flow of heated air into a mutually spaced series of downwardly directed, relatively high velocity heated air impingement jets which laterally diffuse and at least partially overlap prior to striking at least a portion of the upper side surface of said first food support plate member to thereby evenly blanket it with heated air in a manner transferring heat from said second air portion to said upper side surface portion, and/or a food item supported thereon, at an accelerated rate, and
first return means for flowing said first and second air portion outwardly from said first cooking chamber and returning them to said first heated air recirculating means; and
a second module operable independently of said first module and including:
a second housing having a second cooking chamber therein, said second housing having an external configuration substantially identical to that of said first housing, being removably stackable atop said first housing, and having a top side wall,
a relatively large area heat conductive second food support plate member horizontally supported within said second cooking chamber,
second heated air recirculating means, secured to and projecting upwardly from said top side wall of said second housing, for creating and maintaining a second recirculating flow of heated air, at a food cooking temperature, within said second housing, third multiple jet forming means, spaced downwardly apart from said second food support plate member, for converting a first portion of said second recirculating flow of heated air into a mutually spaced series of upwardly directed, relatively high velocity heated air impingement jets which laterally diffuse and at least partially overlap prior to striking the lower side surface of said second food support plate member to thereby evenly blanket it with heated air in a manner uniformly transferring heat from said first portion of said second recirculating flow of heated air to said second food support plate member at an accelerated rate, fourth multiple jet forming means, spaced upwardly apart from said second food support plate member, for converting a second portion of said second recirculating flow of heated air into a mutually spaced series of downwardly directed, relatively high velocity heated air impingement jets which laterally diffuse and at least partially overlap prior to striking at least a portion of the upper side surface of said second food support plate member to thereby evenly blanket said upper side surface portion of said second food support plate member with heated air in a manner transferring heat from said second portion of said second recirculating flow of heated air to said upper side surface portion of said second food support plate member, and/or a food item supported thereon, at an accelerated rate, and second return means for flowing said first and second portions of said second recirculating flow of heated air outwardly from said second cooking chamber and returning them to said second heated air recirculating means.

10. The oven apparatus of claim 9 wherein:
said first and second food support plate members are uniformly perforated and have total open areas respectively greater than the total open areas of said first and third multiple jet forming means, and said first and second return means are disposed such that at least major portions of the air issuing from said first and third multiple jet forming means, respectively, must pass through said first and second food support plate members.

11. The oven apparatus of claim 9 wherein:
each of said first and second food support plate members has a rectangular configuration with a width of approximately 56" and a depth of approxiamtely 36" for accomodating multiple standard sized food items to be cooked.

12. The oven apparatus of claim 9 wherein:
said oven is sized to fit within a rectangular floor footprint area approximately 63" wide by 45" deep.

13. The oven apparatus of claim 9 wherein:
each of said multiple jet forming means include a horizontally disposed corrugated wall member spaced laterally apart from its associated food support plate member and defining within its associated cooking chamber an air supply plenum for receiving recirculating heated air, each of said corrugated wall members having ridges thereon which project toward its associated food support plate member and have spaced series of air discharge openings formed therein.

14. The oven apparatus of claim 13 wherein:
said air discharge openings have generally rectangular configurations.

* * * * *